Patented Apr. 2, 1946

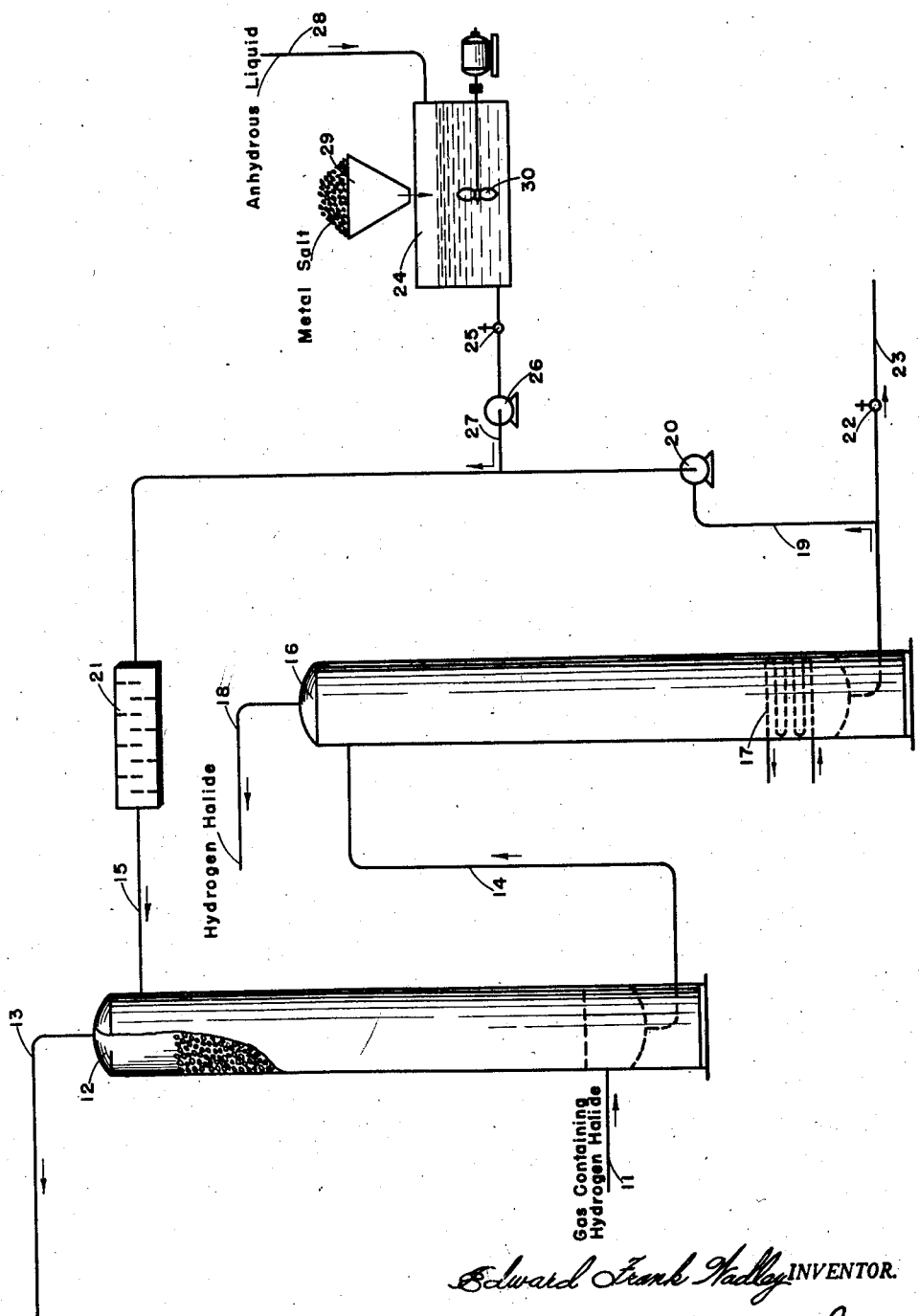

2,397,768

UNITED STATES PATENT OFFICE 2,397,768

RECOVERY OF HYDROGEN HALIDES FROM GASES

Edward Frank Wadley, Baytown, Tex., assignor to Standard Oil Development Company, a corporation of Delaware Application June 7, 1943, Serial No. 489,995

9 Claims. (Cl. 23—154)

The present invention relates to a method for recovering hydrogen halides from gases. More particularly it is concerned with a method for recovering hydrogen chloride from the light hydrocarbon and other fixed gases evolved from isomerization and other conversion operations using hydrogen chloride as a promoter for the reaction.

It has long been known that hydrogen chloride could be absorbed by contacting it with copper sulfate. This is quite satisfactory for removing hydrogen chloride from gases but prior to the present invention it was impossible to recover economically the hydrogen chloride from the loose complex it forms with copper sulfate. Since large quantities of hydrogen chloride are consumed in isomerization and other conversion reactions, it is quite necessary to recover all the unconsumed hydrogen chloride charged to a given process.

Various expedients have been tried in recovering hydrogen chloride for re-use in the above mentioned conversion processes. For example, it has been proposed to deposit copper sulfate on a carrier body such as clay and then contact the copper-sulfate-carrying material with the gases containing hydrogen chloride. While it is possible to remove hydrogen chloride from gases by this method, it too has the disadvantage of not allowing complete recovery of the absorbed material within a reasonable length of time. Moreover, this method is uneconomical for removing hydrogen chloride from gases containing less than 25% of the halide.

It is, therefore, the main object of the present invention to provide a process whereby a hydrogen halide is recovered from gases containing it in a continuous process whereby the reagent is continuously contacted with the hydrogen halide-containing gas in one stage and the hydrogen halide recovered from the reagent under desorption conditions in another stage with the reagent being recycled for re-use.

The present invention is based on the discovery that a hydrogen halide, such as hydrogen chloride, may be absorbed in a slurry of anhydrous copper salt or other salt capable of forming an addition compound with hydrogen halide in a hydrocarbon oil. The slurry containing the addition compound resulting from the absorption is readily desorbed at reasonable temperatures. Furthermore, the relative rates of absorption and desorption in the practice of the present invention have been found to be comparable, permitting continuous operation with absorption and desorption steps in sequence.

By the process of the present invention all of the disadvantages inherent in using copper sulfate, either alone or deposited on a carrier material for recovering hydrogen halide from other gases, have been largely overcome. For example, in the prior art method in which copper sulfate was employed in beds, it was found that, after a certain amount of hydrogen halide was absorbed, the bed assumed a mud-like consistency offering considerable resistance to the flow of gas therethrough. In the present case the absorption medium, being a mobile slurry, is easily handled in pumps and pipe lines and excessive pressure drops in the absorption zone are avoided.

As pointed out before, one of the major expenses in the operation of conducting various conversion operations is the large consumption of promoter required to activate the catalyst employed in the process. Examples of the type of operation which consume large quantities of hydrogen chloride promoter are the isomerization process for paraffin hydrocarbons described by d'Ouville and Evering in their patent, U. S. 2,266,012 and related patents. This process has the disadvantage of the high consumption of hydrogen chloride or other hydrogen halide required to promote the reaction. Specifically, in the process of d'Ouville and Evering, it is necessary to provide a high percentage of hydrogen halide in the reaction. The major proportion of the hydrogen halide charged to the reaction system is lost in the residue gas discharged from the system by virtue of the fact that a large amount of gases, such as methane and ethane, boiling in the same range as hydrogen chloride, is formed during the reaction. Since it is economically impractical to recover the hydrogen chloride from these gases by distillation, it has been the practice, prior to the present invention, to scrub the residue gases with alkaline solution to destroy the halide. It was considered by the skilled worker that the recovery of the hydrogen halide from these gases by ordinarily available means would be economically impractical.

In the practice of the present invention, the effluent gases from such a process are contacted with a slurry of anhydrous copper sulfate in a paraffinic-type hydrocarbon. While a paraffinic type hydrocarbon is to be preferred, other types of hydrocarbons can be employed, such as mixtures of naphthenic or aromatic types of hydrocarbons with predominantly paraffinic hydrocarbons. However, the paraffinic hydrocarbon has been found to be the more suitable of the three types.

While the amount of copper sulfate suspended in the hydrocarbon will vary within rather wide limits, it is preferable to use about 25% by weight of anhydrous copper sulfate based on the hydrocarbon employed. If larger amounts than 50% by weight were employed, the solution could be pumped only with difficulty while, if smaller amounts were used, the degree of absorption would be lower. In general, the slurry should contain between about 15% to 35% by weight of copper sulfate.

The present process is carried out in two stages, an absorption stage and a desorption stage. The conditions in the absorption stage should embrace temperatures in the range from about 60° F. up to temperatures of 100° F. at atmospheric pressures. It is to be understood, of course, that while atmospheric pressure is satisfactory in the absorption stage, the absorption may be conducted at higher pressures up to about 350 lbs./sq. in. or even higher. Likewise, while a temperature of 100° F. has been mentioned as a convenient upper limit, it may be desirable to exceed this and go up to about 125° F.

In the desorption stage, the pressure may vary widely depending, of course, on the pressure of the inlet gas to the absorption stage. The temperatures found most useful in the desorption stage are those ranging between 325° and 380° F. The actual upper limit is that dictated by the dissociation temperatures of the components of the mixture and the melting point of the copper sulfate or equivalent salt. It is understood, of course, when salts other than anhydrous copper sulfate are used, the conditions of absorption and desorption will vary.

The invention will be better understood by reference to the drawing in which the single figure is a flow diagram of a preferred embodiment thereof.

Referring now to the drawing, numeral 11 represents a charge line carrying a gas containing hydrogen chloride. For purposes of illustration, it is assumed that the hydrogen chloride-containing gas entering the system by way of line 11 comprises hydrogen, methane, ethane and 10% or less of heavier hydrocarbons such as propane, butane and pentane. Line 11 connects into the bottom, or adjacent to the bottom, of absorption tower 12 which is equipped with line 13 for discharge of hydrogen chloride-free gas therefrom, and with line 14 for withdrawal of slurry containing absorbed hydrogen chloride.

Near the top of absorption tower 12, inlet line 15 is provided for the introduction of a hydrocarbon-copper sulfate slurry. Tower 12 is preferably a packed tower so designed as to effect intimate contact between the upflowing gaseous material and the downflowing slurry, and to maintain the copper sulfate in suspension in the slurry throughout the time it contacts the upflowing gases. It will be understood that, when temperature and pressure conditions are maintained in the tower such that substantially all of the hydrogen, methane and ethane pass through the tower and are discharged through line 13, some of the propane, butane, and heavier hydrocarbon gases will dissolve in the slurry along with the hydrogen chloride.

The hydrogen chloride-rich slurry is discharged from tower 12 through line 14 and is injected thereby into desorption tower 16. This latter tower is provided with heating means 17 to adjust the temperature therein. As the slurry is heated in desorption tower 16, the hydrogen chloride is vaporized and released overhead through line 18. Small amounts of propane, butane and similar hydrocarbons may also be distilled overhead through line 18 and, in the case of processes such as light paraffin isomerization processes, these hydrocarbons may be returned to the conversion unit along with the hydrogen chloride recovered from line 18. However, if it is desired to separate these hydrocarbons from the hydrogen chloride, this may be done by a simple distillation since propane, butane and the heavier hydrocarbons boil at higher temperatures than anhydrous hydrogen chloride.

The copper sulfate slurry, freed of hydrogen chloride, is withdrawn from desorption tower 16 through line 19 and is pumped back through line 15 by way of pump 20 to absorption zone 12. There is provided in line 15 mixing means 21 to insure maintenance of the suspension of copper sulfate in hydrocarbons.

Since complete recovery of hydrogen chloride is not effected in desorption stage 16, from time to time it may be necessary to withdraw a portion of the used solution by opening valve 22 in line 23. It naturally follows that, when a portion of the slurry is discarded, it will be necessary to add a like amount of fresh slurry. When this becomes necessary, fresh slurry is injected into the system from mixing tank 24 by opening valve 25 and starting pump 26 in line 27 which connects to line 15.

Mixing tank 24 is provided with inlet line 28 for introduction of hydrocarbon, with hopper 29 for introduction of copper sulfate, and with mixing means 30 for thorough agitation of the contents of mixing tank 24.

For successful practice of the present invention it is desirable to employ an oil, in which the copper sulfate has been suspended, having an initial boiling point substantially above the highest temperature employed in desorption stage 16. If provision is not made for refluxing lighter oil, which in some cases it may be desirable to use, a suitable oil for the practice of the present invention is a paraffinic oil having an initial boiling point of about 400° F. It is also necessary that oil employed for making up the slurry of anhydrous copper sulfate and hydrocarbon be substantially dry, otherwise the moisture contained therein would form aqueous hydrogen chloride which would result in rapid corrosion of steel equipment.

Throughout the specification mention has been made of using atmospheric or elevated pressures in conducting the desorption stage of the present invention. It is also within the spirit and scope of the invention to use reduced pressures. In fact, in some cases it may be preferable to use pressures below atmospheric to obtain improved desorption.

The present invention has been described with respect to countercurrent operation in the absorption stage but it should be obvious to one skilled in the art that concurrent flow may be employed with equal success under certain conditions; concurrent flow would require adequate mixing between the gaseous, liquid and solid phases employed.

It is within the spirit and scope of the present invention to use other types of metallic salts in forming a slurry for removal of hydrogen chloride from gases containing it. An example of another salt found useful in the practice of the present invention is cuprous chloride. The properties which a salt must have in order to be useful in the present invention are that it be capable of being formed in its anhydrous state into a slurry with oil and of combining with substantial quantities of hydrogen halide, as by forming an addition compound therewith.

In order to illustrate the practice of the present invention, a run was made in which hydrogen chloride was contacted with a slurry containing 25 weight per cent of anhydrous copper sulfate in a paraffinic oil having a gravity of 44.0° A. P. I. and an initial boiling point of 390° F. and a final boiling point of 460° F. After contacting the hydrogen chloride gas with the copper sulfate slurry for 21½ minutes, it was found that 2.3 moles of hydrogen chloride were absorbed per mole of copper sulfate in the slurry. Assuming the complex $CuSO_4.2HCl$, this molal quantity of 2.3 is slightly in excess of that theoretically possible. This slurry containing absorbed hydrogen chloride was then desorbed under conditions of atmospheric pressure and at a temperature ranging initially from 336° F. to a final temperature of 370° F.

At the end of 21½ minutes heating it was found that 87½ per cent of the amount of hydrogen chloride absorbed by the copper sulfate slurry had been recovered. Further heating for an additional 15 minutes resulted in a total recovery of 2.24 moles of hydrogen chloride. This is equivalent to 97½ per cent of the amount of hydrogen chloride theoretically recoverable for the slurry.

In another operation, a slurry of normal heptane containing 20 weight per cent of anhydrous copper sulfate was employed to absorb hydrogen chloride at a temperature of about 85° F. and atmospheric pressure. The slurry absorbed 2 moles of hydrogen chloride per mole of copper sulfate available in the slurry. The slurry containing absorbed hydrogen chloride was then refluxed for about 20 minutes at the boiling point of the normal heptane solvent. Complete desorption of the slurry at rates comparable to the rate of absorption was obtained; after desorption, the slurry of copper sulfate in normal heptane was re-used over four cycles without diminution of absorption or desorption efficienecy.

While it is possible to absorb hydrogen chloride on solid copper sulfate or on copper sulfate deposited on a carrier, such as clay, it has been found that both of the latter mentioned processes are unsuitable. In runs employing the straight copper sulfate, satisfactory desorption can be obtained only by maintaining a relatively high temperature (approaching the melting point of copper sulfate) and a prohibitively long time for the desorption stage.

From the foregoing data it will be apparent that the practice of the present invention has resulted in a vastly improved operation. Just why a suspension of the copper sulfate in a hydrocarbon should effect such an unexpected result is not completely understood. It has been theorized that better contact between the hydrogen chloride and the copper sulfate is effected by maintenance of the copper sulfate in the suspension. It is believed that more complete desorption is obtained in the present invention because of improved heat transfer in the slurry. However, it is to be understood that the invention is not to be limited by any theories advanced in explanation of the results obtained.

Having fully described the nature and objects of the present invention, what I wish to claim as new and useful and to secure by Letters Patent is:

1. A process for recovering hydrogen halides from their mixtures with other gases which comprises contacting the hydrogen halide-containing gas with a slurry of an anhydrous metal salt having a high absorption capacity for the hydrogen halide in an anhydrous liquid of organic nature inert to the hydrogen halide and subjecting said slurry containing absorbed hydrogen halide to desorption conditions.

2. A process in accordance with claim 1 in which the hydrogen halide is hydrogen chloride.

3. A process in accordance with claim 1 in which the anhydrous liquid is a hydrocarbon.

4. A process according to claim 1 in which the anhydrous liquid is a paraffinic oil.

5. A process for recovering hydrogen chloride from gases containing it which comprises contacting the hydrogen chloride-containing gas with a slurry of anhydrous copper sulfate and a hydrocarbon liquid inert to the hydrogen halide for a time sufficient for substantially complete reaction of the hydrogen chloride with the copper sulfate contained in the slurry, withdrawing the slurry containing hydrogen chloride as a copper complex, subjecting said slurry to conditions suitable for the dissociation of said complex, thereby to regenerate the slurry for the absorption step, recovering hydrogen chloride from said dissociation step and recycling said regenerated slurry to contact additional hydrogen chloride containing gases.

6. A process in accordance with claim 5 in which the hydrocarbon is a paraffinic oil having an initial boiling point between 350° F. and 400° F.

7. A process in accordance with claim 5 in which the absorption is conducted at a temperature not greater than 125° F. and at pressures up to 400 lbs./sq. in. and the dissociation is conducted under temperatures between 325° and 380° F. and at pressures below the pressure of the gas charged to the absorption stage.

8. A process in accordance with claim 5 in which the hydrocarbon is a paraffin hydrocarbon boiling below the melting point of copper sulfate and the dissociation is conducted under conditions of reflux at the boiling point of the paraffin hydrocarbon.

9. A process for recovering hydrogen halides from their mixtures with other gases which comprises contacting the hydrogen halide-containing gas with a slurry of an anhydrous metal salt selected from the class of compounds represented by cuprous chloride and cupric sulfate in a hydrocarbon liquid inert to the hydrogen halide and subjecting said slurry containing absorbed hydrogen halide to conditions suitable for the evolution of hydrogen halide therefrom.

EDWARD FRANK WADLEY.